(12) United States Patent
Honneur

(10) Patent No.: US 9,174,489 B2
(45) Date of Patent: Nov. 3, 2015

(54) TIRE FOR VEHICLE INCLUDING REINFORCEMENTS IN THE SIDEWALLS

(75) Inventor: Franck Honneur, Clermont-Ferrand (FR)

(73) Assignees: Michelin Recherche et Technique S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1349 days.

(21) Appl. No.: 12/597,289

(22) PCT Filed: Apr. 14, 2008

(86) PCT No.: PCT/EP2008/054486
§ 371 (c)(1),
(2), (4) Date: Aug. 30, 2010

(87) PCT Pub. No.: WO2008/128917
PCT Pub. Date: Oct. 30, 2008

(65) Prior Publication Data
US 2010/0307656 A1  Dec. 9, 2010

(30) Foreign Application Priority Data
Apr. 23, 2007  (FR) ...................................... 07 02920

(51) Int. Cl.
*B60C 13/00* (2006.01)
*B60C 9/09* (2006.01)
(Continued)

(52) U.S. Cl.
CPC ................ *B60C 9/09* (2013.01); *B60C 13/003* (2013.01); *B60C 9/0292* (2013.04); *B60C 15/0242* (2013.04); *B60C 2200/10* (2013.04); *Y10T 152/10855* (2015.01); *Y10T 152/10864* (2015.01)

(58) Field of Classification Search
CPC .......... B60C 3/00; B60C 9/09; B60C 9/0292; B60C 13/00; B60C 13/003; B60C 13/04; B60C 13/03; B60C 2013/045; B60C 15/024; B60C 15/0242
USPC ......... 152/548, 555, 558, 542, 546, 539, 523, 152/209.11
IPC ................................ B60C 13/00, 15/00, 15/06
See application file for complete search history.

(56) References Cited

U.S. PATENT DOCUMENTS 3,554,261 A * 1/1971 Mirtain et al. ................. 152/455
3,631,913 A * 1/1972 Boileau ......................... 152/454
(Continued)

FOREIGN PATENT DOCUMENTS

| EP | 0 507 184 | 10/1992 | | |
|----|-----------|---------|---|---|
| JP | 11 278019 | 10/1999 | | |
| WO | WO2006/003742 | * | 1/2006 | ............. B60C 13/00 |

*Primary Examiner* — Justin Fischer
*Assistant Examiner* — Philip N Schwartz
(74) *Attorney, Agent, or Firm* — Cozen O'Connor

(57) ABSTRACT

A tire comprising a carcass-type reinforcement structure and beads, each bead being extended radially outwardly by a sidewall, the sidewalls meeting radially outwardly with a tread, the intersection of the sidewalls and of the tread defining the shoulder ends of the tire. The tire includes, in the area of each of the sidewalls, at least one layer of materials having a stretch rigidity in the longitudinal direction greater than 5000 daN/mm and the radially outer end of said layer of materials is radially inside the shoulder ends of the tire.

21 Claims, 5 Drawing Sheets

(51) Int. Cl.
*B60C 15/024* (2006.01)
*B60C 9/02* (2006.01)

(56) References Cited

U.S. PATENT DOCUMENTS

| | | | |
|---|---|---|---|
| 4,986,326 A * | 1/1991 | Watkins et al. | 152/532 |
| 5,301,730 A | 4/1994 | Delias | |
| 5,996,662 A * | 12/1999 | Cluzel | 152/531 |
| 6,360,799 B1 * | 3/2002 | Iwasaki | 152/517 |
| 2003/0145935 A1 * | 8/2003 | Prost et al. | 156/110.1 |
| 2005/0263230 A1 * | 12/2005 | Merino Lopez | 152/454 |
| 2006/0000530 A1 * | 1/2006 | Hirai | 152/450 |
| 2006/0162836 A1 * | 7/2006 | Maehara et al. | 152/517 |
| 2008/0302459 A1 * | 12/2008 | Kouno | 152/450 |

* cited by examiner

TIRE FOR VEHICLE INCLUDING REINFORCEMENTS IN THE SIDEWALLS

RELATED APPLICATIONS

This is a U.S. national stage under 35 USC §371 of application No. PCT/EP2008/054486, filed on Apr. 14, 2008.

This application claims the priority of French application no. 07/02920 filed Apr. 23, 2007, the entire content of which is hereby incorporated by reference.

FIELD OF THE INVENTION

The present invention relates to a tire intended for a vehicle, and more particularly intended for a two-wheeled vehicle such as a motorcycle.

Although not limited to such an application, the invention will be more particularly described with reference to such a motorcycle, or motorbike, tire.

BACKGROUND OF THE INVENTION

The reinforcing armature or reinforcement of the tires and in particular of motorcycle tires is currently—and more often than not—formed by the stacking of one or more plies conventionally designated "casing plies", "breaker strips", etc. This method of designating the reinforcing armatures originates from the manufacturing method, consisting in producing a series of semi-finished products in the form of plies, provided with wire reinforcement, often longitudinal, which are then assembled or stacked in order to form a tire blank. The plies are produced flat, with large dimensions, and are then cut to the dimensions of a given product. The plies are also initially assembled substantially flat. The blank produced in this way is then shaped to adopt the typical toroidal profile of the tires. The semi-finished products, called "finishing" products, are then applied to the blank, to obtain a product ready for vulcanization.

Such a "conventional" type of method involves, in particular for the tire blank manufacturing phase, the use of an anchoring element (generally a bead wire), used to provide the anchorage or secure the carcass armature within the area of the beads of the tire. Thus, for this type of method, a portion of all of the plies forming the carcass armature (or a part only) is turned up about a bead wire arranged in the bead of the tire. In this way, an anchoring for the carcass armature is created in the bead.

The roll-out in industry of this type of conventional method, despite numerous variants in how to produce the plies and the assemblies, has led those skilled in the art to use a vocabulary suited to the method; hence the generally accepted terminology, notably including the terms "plies", "carcass", "bead wire", "conformation" to designate the transition from a flat profile to a toroidal profile, etc.

There are, today, tires that do not genuinely include "plies" or "bead wires" according to the above definitions. For example, the document EP 0 582 196 describes tires manufactured without the use of semi-finished products in the form of plies. For example, the reinforcing elements of the different reinforcement structures are applied directly to the adjacent layers of rubbery mixtures, the whole being applied in successive layers to a toroidal core, the shape of which is such that a profile is directly obtained that is similar to the final profile of the tire being manufactured. Thus, in this case, there are no longer "semi-finished" products, or "plies" or "bead wires". The basic products, such as the rubbery mixtures and the reinforcing elements in the form of wires or filaments, are directly applied to the core. Since this core is toroidal in shape, there is no longer a need to form the blank to change from a flat profile to a profile in the form of a torus.

Moreover, the tires described in this document do not have the "traditional" casing ply turn-up about a bead wire. This type of anchoring is replaced by an arrangement in which circumferential wires are positioned adjacent to said sidewall reinforcement structure, the whole being embedded in a rubbery anchor or binding mixture.

There are also methods of assembly on a toroidal core that use semi-finished products that are specially adapted for rapid, effective and simple application on a central core. Finally, it is possible to use a mix comprising both certain semi-finished products to produce certain architectural aspects (such as plies, bead wires, etc.), whereas others are produced from the direct application of mixtures and/or reinforcing elements.

In the present document, in order to take account of the recent technological trends both in the manufacturing domain and in the design of products, the conventional terms such as "plies", "bead wires", etc., are advantageously replaced by neutral terms or terms that are independent of the type of method used. Thus, the term "carcass-type reinforcement" or "sidewall reinforcement" is valid to designate the reinforcing elements of a casing ply in the conventional method, and the corresponding reinforcing elements, generally applied to the sidewalls, of a tire produced according to a method without semi-finished products. The term "anchorage area", for its part, can designate both the "traditional" casing ply turn-up about a bead wire of a conventional method, and the assembly formed by the circumferential reinforcing elements, the rubbery mixture and the adjacent sidewall reinforcing portions of a bottom area produced with a method with application on a toroidal core.

As in the case of all the other tires, we are witnessing a radialization of the tires for motorbikes, the architecture of such tires comprising a carcass armature formed by one or two layers of reinforcing elements that form with the circumferential direction an angle than can be between 65° and 90°, said carcass armature being radially topped by a crown armature comprising at least reinforcing elements that are generally textile. There are, however, non-radial tires to which the invention also relates. The invention even relates to partially radial tires, that is, tires in which the reinforcing elements of the carcass armature are radial over at least a part of said carcass armature, for example in the part corresponding to the crown of the tire.

Numerous crown armature architectures have been proposed, depending on whether the tire is intended to be mounted on the front of the motorbike or on the back. A first structure consists, for said crown armature, in employing only circumferential ropes, and said structure is more particularly used for the rear position. A second structure, directly inspired by the structures commonly employed in tires for private passenger vehicles, has been used to improve the wear resistance, and consists in the use of at least two crown working layers of reinforcing elements parallel with each other in each layer but crossed from one layer to the next, forming with the circumferential direction acute angles, such tires being more particularly suited to the front of the motorbikes. Said two crown working layers can be associated with at least one layer of circumferential elements, generally obtained by helically winding a strip of at least one rubber-coated reinforcing element.

The patent FR 2 561 588 thus describes such a crown armature, with at least one ply, the reinforcing elements of which form, with the circumferential direction, an angle that can vary between 0° and 8°, the modulus of elasticity of such elements rising to at least 6000 N/mm$^2$, and, arranged between the carcass armature and the ply of circumferential elements, a damping layer mainly formed by two plies of elements crossed from ply to the next, forming between them angles of between 60° and 90°, said crossed plies being formed by textile reinforcing elements having a modulus of elasticity of at least 6000 N/mm$^2$.

The document EP 0 456 933, in order to give a motorbike tire excellent stability at high speed and an excellent ground contact property, discloses, for example, forming a crown armature with at least two plies: a first ply, radially closest to the carcass armature, consisting of ropes oriented with an angle of between 40° and 90° relative to the circumferential direction and the second ply, radially closest to the tread, consisting of ropes wound helically in the circumferential direction.

The U.S. Pat. No. 5,301,730, in order to increase the driveability of a tire for the rear position of a motorbike, proposes a crown armature consisting, working from the radial carcass armature to the tread, of at least one ply of substantially circumferential elements and two plies of elements crossed from one ply to the next, forming with the circumferential direction an angle that can be between 35° and 55°, the ply of elements parallel to the circumferential direction being able to be formed by elements made of aromatic polyamide, and the plies of crossed elements being able to be made of aliphatic polyamide.

In their researches, the inventors have shown that, to increase the transmission of the engine and braking torques and the lateral thrust forces via the tires, one solution is to run at pressures lower than those usually prescribed and in particular at pressures less than 2 bar, even less than 1.5 bar. The usual pressures are greater than 2 bar, even greater than 2.5 bar.

Running tests carried out in this way have confirmed the increase in the transmission of the engine and braking torques and of the lateral thrust forces through the tires; however, it emerges that, at these tire inflation pressures, the motorbike rider observes behavior problems and in particular perception problems according to the lateral direction of the tire, that is, according to the direction perpendicular in the plane of the ground to the direction defined by the two geometrical centre points of areas of contact of each of the tires.

SUMMARY OF THE INVENTION

One object of the invention is to produce tires for motorcycles, designed to be used running at pressures less than 2 bar, without in any way affecting the properties that are essential to the satisfaction of the users.

This and other objects have been achieved according to the invention which is directed to a tire comprising a carcass-type reinforcement structure, including reinforcing elements, the tire comprising beads, the base of which is designed to be fitted on a rim seat, each bead being extended radially outwardly by a sidewall, the sidewalls meeting radially outwardly with a tread, the intersection of the sidewalls and of the tread defining the shoulder ends of the tire, and comprising, under the tread, a crown reinforcement structure, said tire also including, in the area of each of the sidewalls, at least one layer of materials having a stretch rigidity in the longitudinal direction greater than 5000 daN/mm and the radially outer end of said layer of materials being radially inside the shoulder ends of the tire.

The longitudinal direction of the tire, or circumferential direction, is the direction corresponding to the periphery of the tire and defined by the rolling direction of the tire.

A circumferential plane or circumferential plane of cross section is a plane perpendicular to the rotation axis of the tire. The equatorial plane is the circumferential plane passing through the centre or crown of the tread.

The transversal or axial direction of the tire is parallel to the rotation axis of the tire.

A radial plane contains the rotation axis of the tire.

A shoulder end is defined, in the area of the shoulder of the tire, when the latter is fitted on its service rim and inflated, by the orthogonal projection on the outer surface of the tire of the intersection of the tangents to the surfaces of an axially outer end of the tread on the one hand and the radially outer end of a sidewall on the other hand.

In the case of tires for motorcycles, the shoulder ends correspond to the axially outermost points of the tire.

The stretch rigidity in the longitudinal direction of the layer of materials is determined in a manner known to those skilled in the art from dynamometric measurements of the layer or of its constituent materials.

For example, regarding the wires or metal ropes, the measurements of force at break (maximum load in N), of tensile strength (in MPa) and of elongation at break (total elongation as a %) are performed by traction according to the 1984 ISO 6892 standard.

Regarding the rubber compositions, the modulus measurements are performed by traction according to the standard AFNOR-NFT-46002 of September 1988: the nominal secant modulus (or apparent stress, in MPa) at 10% elongation (normal temperature and relative humidity conditions according to the December 1979 AFNOR-NFT-40101 standard) is measured in a second elongation (i.e. after a shakedown cycle).

Regarding textile threads or ropes, the mechanical properties are measured on fibers having been subjected to prior conditioning. The expression "prior conditioning" should be understood to mean the storage of the fibers for at least 24 hours, before measurement, in a standard atmosphere according to the European standard DIN EN 20139 (temperature of 20±2° C.; relative humidity of 65±2%). The mechanical properties in extension (toughness, modulus, elongation and energy at break) are measured in a known manner using a type 1435 or type 1445 ZWICK GmbH & Co (Germany) fraction machine. The fibers, after having been given a weak preliminary protective twist (helix angle of approximately 6°), undergo a traction over an initial length of 400 mm at a nominal speed of 200 mm/min. All the results are an average of 10 measurements.

According to a preferred embodiment of the invention, the radial distance between the radially outer end of the layer of materials, having a stretch rigidity in the longitudinal direction greater than 5000 daN/mm, and the radially inner end of the tire, is between 50% and 80%, and preferably between 50% and 75% of the radial distance between a shoulder end and the radially inner end of the tire.

Preferably again, the radial distance between the radially inner end of said layer of materials and the radially inner end of the tire is between 10 and 65% and preferably greater than 40% and also preferably greater than 50% of the radial distance between a shoulder end and the radially inner end of the tire.

The radial distance measurements described previously are performed on a tire fitted on a rim and inflated to a pressure of 1.5 bar, the pressure being measured hot, that is, the tire having been run up to its working temperature.

Advantageously, when the tire is fitted on a rim with hooks and inflated to a pressure of 1.5 bar, the radial distance between the radially outer end of the layer of materials and the radially outer end of the hook is between 20% and 60% and preferably greater than 40% of the radial distance between the shoulder end and the radially outer end of the hook.

Advantageously again, when the tire is fitted on a rim with hooks and inflated to a pressure of 1.5 bar, the radial distance between the radially inner end of the layer of materials and the radially outer end of the hook is less than 30% and preferably less than 10% of the radial distance between a shoulder end and the radially outer end of the hook.

According to an embodiment of the invention, the curvilinear distance between the orthogonal projection of the radially outer end of the layer of materials on the outer surface of the sidewall and the radially innermost point of the outer surface of the sidewall is advantageously between 50% and 80% and preferably between 50% and 75% of the curvilinear distance between a shoulder end and the radially innermost point of the outer surface of the sidewall.

Similarly, the curvilinear distance between the orthogonal projection of the radially inner end of the layer of materials on the outer surface of the sidewall and the radially innermost point of the outer surface of the sidewall is advantageously between 10% and 65% and preferably greater than 40% and preferably also greater than 50% of the curvilinear distance between a shoulder end and the radially innermost point of the outer surface of the sidewall.

The radially innermost point of the outer surface of the sidewall is defined, in the area of the bead of the tire, by the orthogonal projection on the outer surface of the tire of the intersection of the tangents to the surfaces of an axially outer end of the radially inner surface of a bead on the one hand and the radially inner end of a sidewall on the other hand.

According to a first variant embodiment of the invention, the layer of materials comprises at least one layer of reinforcing elements oriented in the circumferential direction.

According to an embodiment of the invention, the reinforcing elements are considered to be oriented in the circumferential direction when they form an angle with the longitudinal direction less than 8°.

Advantageously, according to this variant embodiment of the invention, the reinforcing elements oriented in the circumferential direction are metallic and preferably made of steel.

According to this variant embodiment of the invention, the reinforcing elements oriented in the circumferential direction can also be made of aramid and the layer of materials consists of several layers of reinforcing elements oriented in the circumferential direction. Such an embodiment can be interesting in terms of tire weight. The aramid also offers the benefit of better accepting the compression stresses.

According to a second variant embodiment of the invention, the layer of materials comprises at least two layers of reinforcing elements parallel with each other in each layer and crossed from one layer to the next, forming with the circumferential direction angles of between 10° and 45°.

According to a third variant embodiment of the invention, the layer of materials comprises at least one layer of polymeric mixtures. According to the latter variant embodiment, it may be a layer of a single polymeric mixture or even a layer combing several polymeric mixtures. In both cases, the polymeric mixtures can also be reinforced, for example by fillings or short fibers.

According to one or other of these variant embodiments of the invention, said layer of materials is either axially inside or axially outside the carcass-type reinforcement structure. In the case of the second variant embodiment whereby the layer of materials comprises at least two layers of reinforcing elements parallel to each other in each layer and crossed from one layer to the next, the invention advantageously provides for the layers of reinforcing elements to be distributed axially either side of the carcass-type reinforcement structure. According to other embodiments of tires according to the invention comprising at least two layers of materials as defined previously, said layers can be, as in the case of a single layer, either axially inside or axially outside the carcass-type reinforcement structure or even distributed axially either side of the carcass-type reinforcement structure.

The tire as described above can be run on motorcycles with inflation pressures less than 2 bar, even less than 1.5 bar. Compared to tires that are similar from a design point of view but do not include layers of materials inserted into the sidewalls and inflated to usual pressures greater than 2 bar, it has been proved according to expectations that it is possible to withstand greater engine and braking torques and lateral thrust forces with tires according to the invention and inflated to pressures of the order of 1.5 bar. Furthermore, regarding the behavior and in particular the perceptions according to the lateral direction of the tire when running, test riders no longer mention any difference between the tires according to the invention and inflated to pressures of the order 1.5 bar and the usual tires inflated to higher pressures.

These results in terms of behavior, compared to a usual tire that would be inflated to a pressure less than 2 bar, can be interpreted as an increase in stresses imposed on the reinforcing elements of the carcass structure on inflation because of the presence of the layer of materials and of its properties in terms of stretch rigidity in the longitudinal direction which induce a different tire profile in the area of the sidewall. This increase in the stresses appears to offset the reduced inflation pressure compared to the usual inflation pressures regarding the behavior properties of the vehicle when running and in particular the perceptions according to the lateral direction of the tire observed by the test riders.

Another aspect of the invention is directed to a tire comprising a carcass-type reinforcement structure, consisting of reinforcing elements, the tire comprising beads, the base of which is designed to be fitted on a rim seat, each bead being extended radially outwardly by a sidewall, the sidewalls meeting radially outwardly with a tread, the intersection of the sidewalls and the tread defining the shoulder ends of the tire, and comprising, under the tread, a crown reinforcement structure, the tire having on the outer surface of each of the sidewalls a boss extending circumferentially, the radius of curvature of which is between 8 and 20 mm.

The curvature of a sidewall of the tire defined in this way according to the invention advantageously has a point of inflexion that is radially outside the boss, this point of inflexion being radially inside the shoulder ends of the tire.

Advantageously again, the tire being fitted on a rim including hooks, the curvature of a sidewall has a point of inflexion radially inside the boss.

Such a tire is advantageously produced according to a technique of the hard-core or toroidal based type that in particular allows the placement of the reinforcing elements in the quasi-final position; in practice, since a conformation step is not required with this type of method, the reinforcing elements are no longer displaced after their placement.

A variant embodiment of the invention also provides for the carcass-type reinforcement structure not to extend from one bead to the other but from one sidewall to the other, the ends of the carcass-type reinforcement structure being radially close to the radially inner ends of the layers of materials inserted into the sidewalls and preferably radially inside the radially inner ends of said layers of materials. Such an embodiment is in particular facilitated by production according to a hard-core based type technique.

Advantageously, in the case of a radial structure, the reinforcing elements of the carcass-type reinforcement structure form with the circumferential direction an angle of between 65° and 90°.

An advantageous embodiment of the invention also provides for the carcass-type reinforcement structure to comprise two half-layers extending, for example, from the shoulders to the beads. According to the nature, the quantity and the arrangement of the crown reinforcing elements, the invention effectively provides for the elimination of the carcass structure in at least a portion of the area of the tire located under the tread. Such a carcass structure can be produced according to the teachings of the document EP-A-0 844 106. The previously stated relative positions of the different layers of the crown reinforcement structure are also compatible with such a carcass structure.

According to an embodiment of the invention, the crown reinforcement structure of the tire comprises at least one layer of reinforcing elements, called working layer, in which the reinforcing elements are parallel to each other and form an angle of at least 15° with the longitudinal direction.

Advantageously according to an embodiment of the invention, the crown reinforcement structure comprises at least two layers of reinforcing elements parallel to each other and crossed from one layer to the next.

According to the latter embodiment of the invention, the reinforcing elements of two radially adjacent working layers advantageously form between them angles of between 20 and 160°, and preferably between 40 and 100°.

According to a preferred embodiment of the invention, the reinforcing elements of the working layers are made of textile material.

According to another embodiment of the invention, the reinforcing elements of the working layers are made of metal.

According to other embodiments of the invention, the crown reinforcement structure comprises at least one layer of circumferential reinforcing elements.

According to a preferred embodiment of the invention, the reinforcing elements of the layer of circumferential reinforcing elements of the crown reinforcement structure are metallic and/or textile and/or made of glass. The invention notably provides for the use of reinforcing elements of different types in one and the same layer of circumferential reinforcing elements.

Preferably again, the reinforcing elements of the layer of circumferential reinforcing elements of the crown reinforcement structure have a modulus of elasticity greater than 6000 N/mm$^2$.

A variant embodiment of the invention, designed to limit the vibratory behavior of the tire, notably the "shimmy", also advantageously provides for an anti-vibration means to be arranged circumferentially in the area of the shoulders and extend radially on the one hand substantially radially outwardly towards the crown and on the other hand substantially radially inwardly in the sidewall, said anti-vibration means comprising at least one alignment of substantially circumferential reinforcing elements. Such an anti-vibration means is in particular described in the document EP A 1 307 350.

BRIEF DESCRIPTION OF THE DRAWINGS

Other details and advantageous characteristics of the invention will become apparent hereinbelow from the description of exemplary embodiments of the invention, with reference to FIGS. 1 to 5 which represent.

DETAILED DESCRIPTION OF THE DRAWINGS

FIGS. 1 to 5 are not shown to scale, in order to simplify their understanding. The figures represent only a half-view of a tire which is extended symmetrically relative to the axis XX' which represents the circumferential median plane, or equatorial plane, of a tire.

Figure 1:
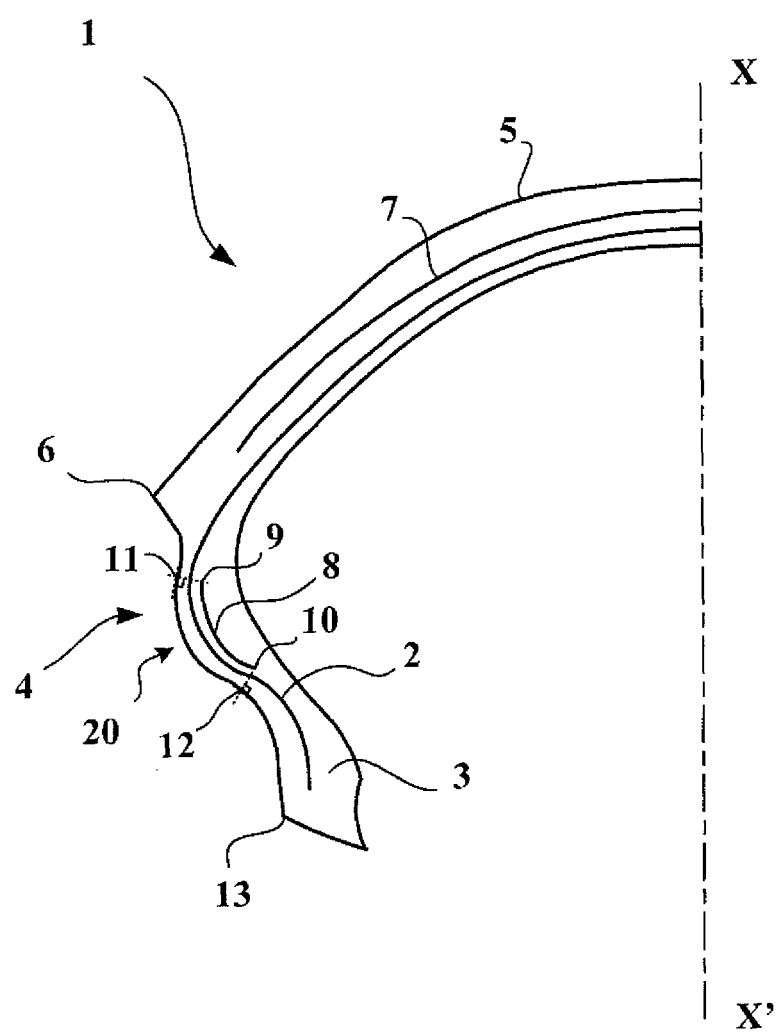
FIG. 1, a meridian view of a diagram of a tire according to one embodiment of the invention, FIG. 2, a meridian view of a diagram of a tire according to the invention fitted on a rim, FIG. 3, a meridian view of a diagrammatic representation of the bead of a tire, FIG. 4, a meridian view of a diagram of a tire according to a second embodiment of the invention, FIG. 5, a meridian view of a diagram of a tire according to a third embodiment of the invention.

FIG. 1 represents a tire 1 of type 180/55 R 17 comprising a carcass armature consisting of a single layer 2 comprising textile-type reinforcing elements. The layer 2 consists of reinforcing elements that are arranged radially. The radial positioning of the reinforcing elements is defined by the lay angle of said reinforcing elements; a radial arrangement corresponds to a lay angle of said elements relative to the longitudinal direction of the tire of between 65° and 90°.

Said carcass layer 2 is anchored on each side of the tire 1 in a bead 3, the base of which is designed to be fitted on a rim seat. Each bead 3 is extended radially outwardly by a sidewall 4, said sidewall 4 meeting radially outwardly with the tread 5. The intersection of the tread and the sidewall forms the shoulder end 6 which corresponds to the axially outermost point of the tire.

The tire 1 has a curvature value greater than 0.15 and preferably greater than 0.3. The curvature value is defined by the ratio Ht/Wt, that is, by the ratio of the height of the tread to the maximum width of the tread of the tire. The curvature value will advantageously be between 0.25 and 0.5 for a tire designed to be fitted on the front of motorcycle and will advantageously be between 0.2 and 0.5 for a tire designed to be fitted at the back.

The tire 1 also comprises, under the tread, a crown armature 7.

According to the invention, the tire comprises a layer of materials 8 produced by winding a metal rope whose equivalent compacted diameter of metal is equal to 1.05 mm, the pitch of the winding being equal to 1.4 mm. The stretch rigidity of the layer of materials produced in this way is of the order of 10 000 daN/mm.

The curvilinear distance between the orthogonal projection 11 of the radially outer end 9 of the layer of materials on the outer surface of the sidewall 4 and the radially innermost point 13 of the outer surface of the sidewall is equal to 74% of the curvilinear distance between the shoulder end 6 and the radially innermost point 13 of the outer surface of the sidewall.

The curvilinear distance between the orthogonal projection 12 of the radially inner end 10 of the layer of materials on the outer surface of the sidewall 4 and the radially innermost point 13 of the outer surface of the sidewall is equal to 59% of the curvilinear distance between the shoulder end 6 and the radially innermost point 13 of the outer surface of the sidewall.

This figure also shows that the tire has, on the outer surface of its sidewall 4, a boss 20 which extends circumferentially and the radius of curvature of which is equal to 12 mm.

Figure 2:
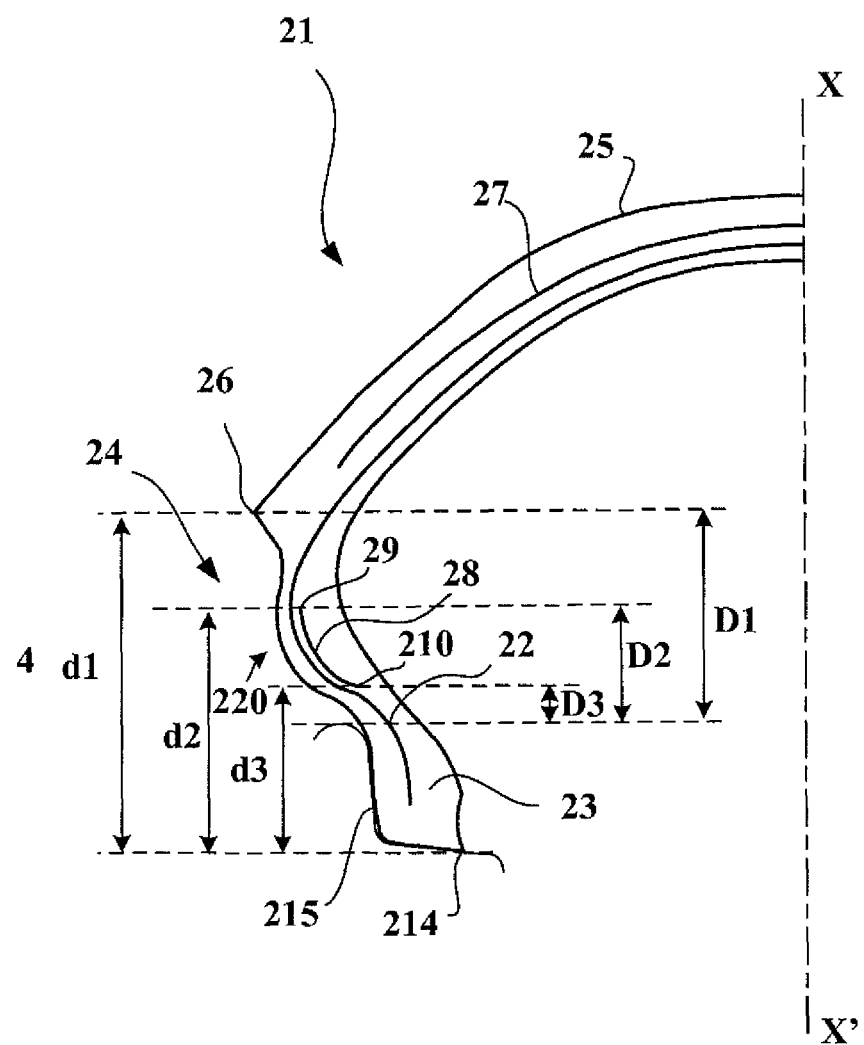

FIG. 2 illustrates a diagram of a tire 21 similar to that of FIG. 1 fitted on a rim 215. The rim 215 is shown only partially to illustrate mainly its area of contact with the bead of the tire. The tire mounted in this way on its rim is inflated to a pressure of 1.5 bar.

According to the invention, the radial distance d2 between the radially outer end 29 of the layer of materials 28 and the radially inner end 214 of the tire is equal to 72% of the radial distance d1 between a shoulder end 26 and the radially inner end of the tire 214.

The radial distance d3 between the radially inner end 210 of the layer of materials 28 and the radially inner end 214 of the tire is equal to 58% of the radial distance d1 between a shoulder end 26 and the radially inner end of the tire 214.

The radial distance D2 between the radially outer end 29 of the layer of materials 28 and the radially outer end 14 of the hook 215 is equal to 54% of the radial distance D1 between a shoulder end 26 and the radially outer end of the hook 215.

The radial distance D3 between the radially inner end 210 of the layer of materials 28 and the radially outer end of the hook 215 is equal to 27% of the radial distance D1 between a shoulder end 26 and the radially outer end of the hook 215.

Figure 3:
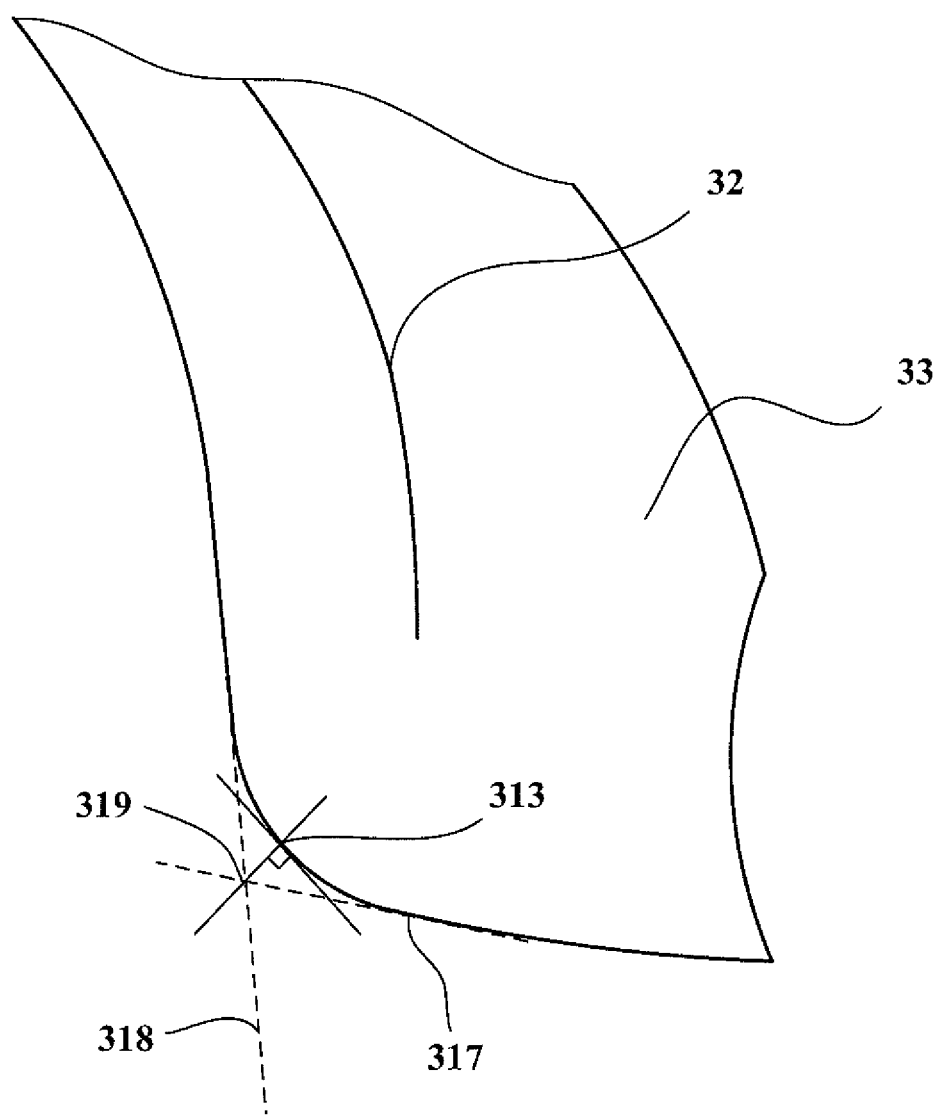

FIG. 3 represents a diagram of a partial view of the bead 33 of a tire similar to that of FIG. 1 on which is drawn the intersection 319 of a first tangent 317 to the surface of the axially outer end of the radially inner surface of the bead 33 and a second tangent 318 to the axially outer surface of the radially inner end of the sidewall 34. The orthogonal projection of the intersection 319 of these two tangents 317, 318 on the outer surface of the tire defines the radially innermost point of the outer surface of the sidewall 34.

Figure 4:
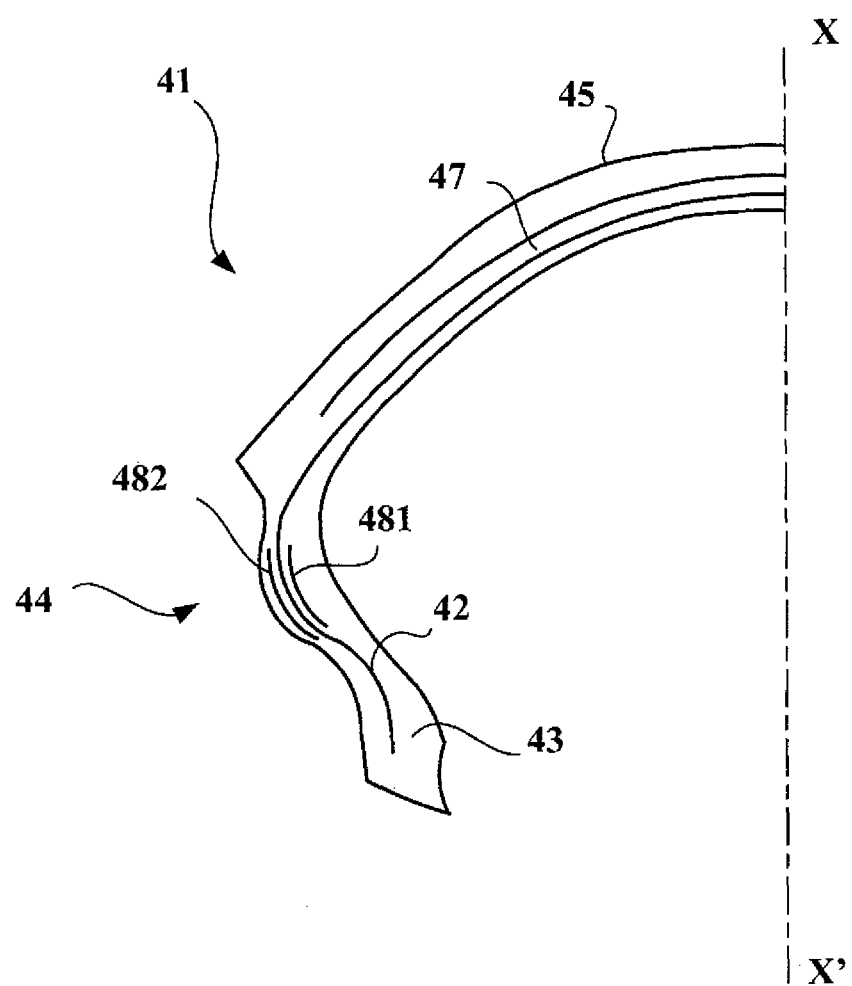

FIG. 4 illustrates a diagram of a tire according to a second embodiment of the invention. The tire 41 of FIG. 4 differs from that of FIG. 1 in that the tire comprises two layers of materials 481, 482 arranged axially either side of the carcass layer 2. According to this embodiment of the invention, each of the two layers of materials 481, 482 is produced by winding a metal rope whose equivalent compacted diameter of metal is equal to 1.05 mm and the pitch of the winding being equal to 1.4 mm. The stretch rigidity of each of the layers of materials 481, 482 produced in this way is of the order of 10 000 daN/mm.

Figure 5:
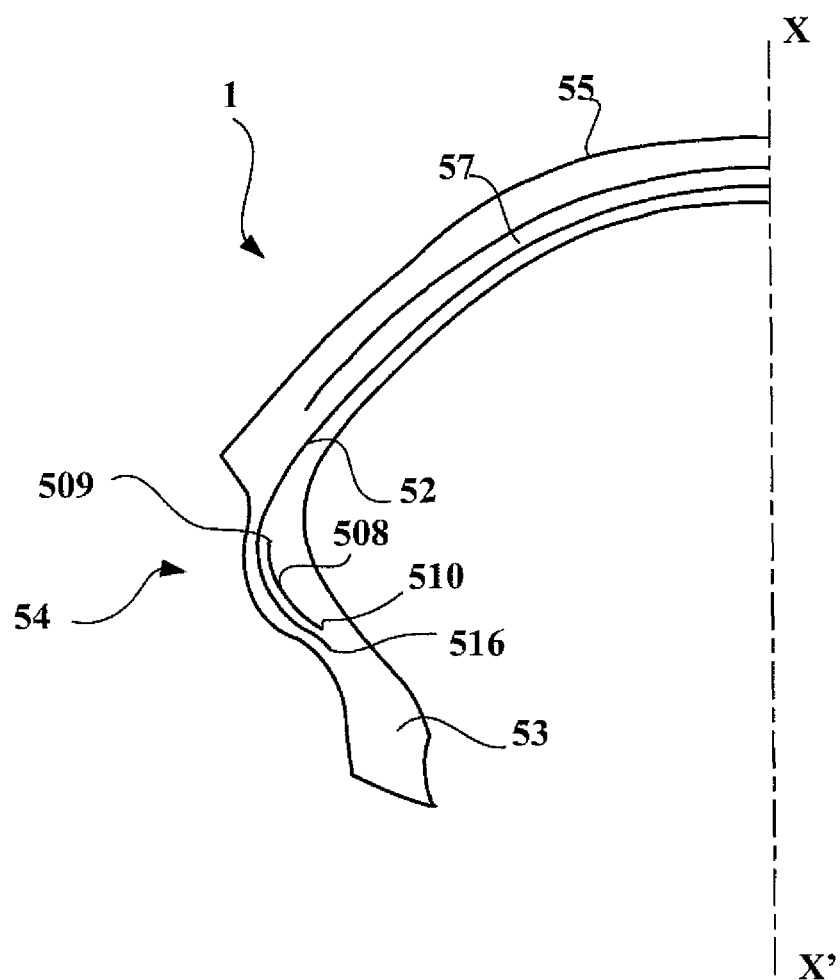

FIG. 5 illustrates a diagram of a tire according to a third embodiment of the invention. The tire 51 of FIG. 5 differs from that of FIG. 1 in that the tire comprises a carcass layer 52, the radially inner end 516 of which does not extend to the area of the bead 53, but stops radially level with the radially inner end 510 of the layer of material 58 and more precisely slightly radially inside said end. Such a variant embodiment is more particularly suited to the case of a tire manufactured on a hard core which does not include any bead wire but an anchorage architecture, not represented in the figure, which, in such a case, would be adapted to the dimension of the carcass layer 52.

What is claimed is:

1. A tire comprising:
   a carcass-type reinforcement structure, including reinforcing elements;
   beads, the base of which is configured to be fitted on a rim seat, each bead being extended radially outwardly by a sidewall, the sidewalls meeting radially outwardly with a tread, the intersection of the sidewalls and of the tread defining shoulder ends of the tire;
   under the tread, a crown reinforcement structure;
   in the area of each of the sidewalls, at least one layer of materials having a stretch rigidity in the longitudinal direction greater than 5000 daN/mm, wherein a radially outer end of said layer of materials is radially inside the shoulder ends of the tire; and
   on the outer surface of each of the sidewalls, a boss extending circumferentially, the radius of curvature of which is between 8 and 20 mm,
   wherein, for each of the sidewalls, a portion of the carcass-type reinforcement structure has a curvature similar to the curvature of the boss, and
   wherein, for each of the sidewalls, the sidewall radially inside the boss has a first inflection point and the sidewall radially outside the boss has a second inflection point.

2. The tire according to claim 1, wherein the radial distance between the radially outer end of the layer of materials and the radially inner end of the tire is between 50% and 80% of the radial distance between a shoulder end and the radially inner end of the tire.

3. The according to claim 1, wherein the radial distance between the radially inner end of the layer of materials and the radially inner end of the tire is between 40% and 65% of the radial distance between a shoulder end and the radially inner end of the tire.

4. The tire according to claim 1, wherein, the tire is fitted on a rim including hooks and inflated to a pressure of 1.5 bar, and wherein the radial distance between the radially outer end of the layer of materials and the radially outer end of the hook is between 40% and 60% of the radial distance between a shoulder end and the radially outer end of the hook.

5. The tire according to claim 1, wherein the tire is fitted on a rim including hooks and inflated to a pressure of 1.5 bar, and wherein the radial distance between the radially inner end of the layer of materials and the radially outer end of the hook is less than 30% of the radial distance between a shoulder end and the radially outer end of the hook.

6. The tire according to claim 1, wherein the curvilinear distance between the orthogonal projection of the radially outer end of the layer of materials on the outer surface of the rim and the radially innermost point of the outer surface of the sidewall is between 50% and 80% of the curvilinear distance between a shoulder end and the radially innermost point of the outer surface of the sidewall.

7. The tire according to claim 1, wherein the curvilinear distance between the orthogonal projection of the radially inner end of the layer of materials on the outer surface of the sidewall and the radially innermost point of the outer surface of the sidewall is between 40% and 65% of the curvilinear distance between a shoulder end and the radially innermost point of the outer surface of the sidewall.

8. The tire according to claim 1, wherein the layer of materials comprises at least one layer of reinforcing elements oriented in the circumferential direction.

9. The tire according to claim 8, wherein the reinforcing elements oriented in the circumferential direction are metallic.

10. The tire according to claim 1, wherein the layer of materials comprises at least two layers of reinforcing elements parallel with each other in each layer and crossed from one layer to the next, forming with the circumferential direction angles of between 10° and 45°.

11. The tire according to claim 1, wherein the layer of materials comprises at least one layer of polymeric mixtures.

12. The tire according to claim 1, wherein the reinforcing elements of the carcass-type reinforcement structure form with the circumferential direction an angle of between 65° and 90°.

13. The tire according to claim 1, wherein the carcass-type reinforcement structure is made of two half-layers extending from the shoulders to the beads.

14. The tire according to claim 1, wherein the crown reinforcement structure comprises at least one layer of reinforcing elements called working layer, said reinforcing elements being parallel with each other and forming an angle of at least 15° with the longitudinal direction.

15. The tire according to claim 1, wherein the crown reinforcement structure comprises at least two layers of reinforcing elements parallel with each other and crossed from one layer to the next.

16. The tire according to claim 15, wherein the reinforcing elements of two radially adjacent working layers form between them angles of between 20 and 160°.

17. The tire according to claim 15, wherein the reinforcing elements of the working layers are made of textile material.

18. The tire according to claim 15, wherein the reinforcing elements of the working layers are made of metal.

19. The tire according to claim 15, wherein the crown reinforcement structure comprises at least one layer of circumferential reinforcing elements.

20. The tire according to claim 19, wherein the reinforcing elements of the layer of circumferential reinforcing elements are metallic and/or textile and/or made of glass.

21. The tire according to claim 1, wherein an anti-vibration means is arranged circumferentially in the area of the shoulders and extends radially on the one hand substantially radially outwardly towards the crown and on the other hand substantially radially inwardly in the sidewall, said anti-vibration means comprising at least one alignment of substantially circumferential reinforcing elements.

* * * * *